United States Patent [19]

Koerts et al.

[11] Patent Number: 4,702,839

[45] Date of Patent: Oct. 27, 1987

[54] PROCESS FOR THE RECOVERY OF MONOSACCHARIDES FROM POLY-, OLIGO- AND/OR DISACCHARIDES CONTAINING TUBEROUS PLANTS BY MEANS OF ULTRAFILTRATION

[75] Inventors: Kees Koerts, Driebergen; Theodoor R. Hanssens, Oud-Gastel, both of Netherlands

[73] Assignee: Cooperatieve Vereniging Suiker Unie U.A., Breda, Netherlands

[21] Appl. No.: 611,687

[22] Filed: May 18, 1984

[30] Foreign Application Priority Data

May 19, 1983 [NL] Netherlands ........................ 8301787

[51] Int. Cl.[4] ........................ B01D 13/00

[52] U.S. Cl. ........................ 210/638; 210/651

[58] Field of Search ........................ 127/48, 55; 210/639, 210/651, 638

[56] References Cited

U.S. PATENT DOCUMENTS 3,799,806 3/1974 Madsen ........................ 210/639 X 4,083,732 4/1978 Paley ........................ 210/651 X

FOREIGN PATENT DOCUMENTS 2135169 12/1972 France ........................ 210/651

OTHER PUBLICATIONS

WO 82/00569, 3/4/82, Yves Vrignaud et al., Int. "Method of Obtaining Clear Vegetable Juices etc.".

"Production of Fructose Syrups from Inulin-Containing Plants, Biotechnology and Bioengineering, vol. XX, 1978, M. P. J. Kierstan, pp. 447–450.

"New Process for Inulin Purification, Gerasimenko, A. A. et al., Chemical Abstracts, vol. 94, No. 21, 5/25/81, p. 349.

"Purification of Sugar Solutions", H. Kuroe et al., Chemical Abstracts, vol. 87, No. 20, 11/14/77, p. 83.

"The Recovery of Sugar from Citrus Press Liquor by Ultrafiltration", B. R., Breslau, B. R. Chemical Abstracts, vol. 91, No. 7, 8/12/79, p. 537.

McGinnis, "Beet-Sugar Technology", p. 162.

*Primary Examiner*—Frank Spear

*Attorney, Agent, or Firm*—Buell, Ziesenheim, Beck & Alstadt

[57] ABSTRACT

Process for the recovery of monosaccharides from poly-, oligo- and/or disaccharides containing tuberous plants by reducing the roots of the tuberous plants by means of grating, extracting the reduced material with unwarmed water, for instance of at most 18° C., subjecting the extract at first to an ultrafiltration and then to a demineralization after which the saccharides present in the obtained solution are hydrolyzed by means of a cation exchanger ($H^+$-form) or by acidification.

4 Claims, No Drawings

PROCESS FOR THE RECOVERY OF MONOSACCHARIDES FROM POLY-, OLIGO- AND/OR DISACCHARIDES CONTAINING TUBEROUS PLANTS BY MEANS OF ULTRAFILTRATION

The invention relates to a process for the recovery of monosaccharides from poly-, oligo- and/or disaccharides containing tuberous plants by means of ultrafiltration.

It is known that fructose can be recovered from the roots of the chicory plant (Cichorium intibus) which contain almost 20 percent by weight of carbohydrates consisting for ¾ of the carbohydrate inulin. Mainly two recovery methods are known viz.

(a) a process according to which the chicory roots are first cut into pieces and subsequently subjected to an extraction with hot water for recovering the present saccharides. To the juice obtained in this way an acid, preferably hydrochloric acid is added for hydrolyzing the present poly-, oligo- and disaccharides into monosaccharides. Then the obtained hydrolyzed juice is neutralized preferably with calciumoxide. The calcium-fructosate formed thereby is separated from non-soluble components like fibers and albumens by filtration. The filtercake is washed with water for transferring the residual calcium fructosate still present therein to the filtrate. Then fructose is liberated from the calcium fructosate present in the filtrate by means of acidification for instance with hydrosulfuric acid. From the fructose syrup obtained in this way the present ions which are added for the major part during the recovery are removed.

This known process has the objection that 10 to 15 percent of the present carbohydrates viz. glucose is lost (huge waste-water problems). However, an advantage of this process is that a fructose syrup with a high fructose content is obtained.

(b) another process according to which the chicory roots are also first cut into pieces and subsequently subjected to an extraction with water to recover the present saccharides. After that the obtained juice is acidified for instance with hydrochloric acid and neutralized for instance with calcium oxide. After filtration and washing the filtrate is lead over an ion exchanger to remove the (added) ions and decolorized. With respect to the process mentioned under (a) this process has the advantage that the losses of glucose are very small.

However, the hydrolysis of the poly-, oligo-, and disaccharides and the precipitation of the proteins and pectins in the juice should be carried out by acidification with an acid (hydrochloric acid) according to both the process under (a) and under (b). One may not acidify the juice by subjecting it to an ion exchanger because the dissolved protein and pectin molecules present in the juice would precipitate on the ion exchanger so that the ion exchanger would loose its activity for the most part. Even if the juice would be filtrated beforehand then still the proteins and pectins would not be removed in a sufficient way from the juice.

Another field of the sugar technology relates to the preparation of invert sugar from granulated sugar. According to said preparation a solution of granulated sugar in water is prepared which subsequently is hydrolyzed with an acid preferably citric acid or acetic acid. After precipitation of calcium-fructosate by neutralization of the added acid and washing, the calcium-fructosate is decomposed by reacting with an acid. Then the diluted solution is concentrated and cooled to −10° C., at which temperature the present fructose and glucose crystallize out separately for the most part.

It was found that the above mentioned process for the recovery of fructose from chicory roots can be improved and simplified in an essential way by subjecting the juice obtained at the water extraction of the tuberous plants directly to an ultrafiltration according to which an inulin-containing permeate is obtained free of both large contaminations and pectin and albuminous contaminations. Therefore this product can be acidified without objection by means of a cation exchanger ($H^+$-form) for hydrolyzing the inulin. Preferably the temperature during the hydrolysis is raised during at most 2 minutes at 60° to 130° C. Then the anions are removed. In this way a fructose syrup is obtained containing about 15 percent by weight of fructose.

The advantages of this process are that hardly any loss of carbohydrate takes place and the obtained syrup is free of foreign ions. From an economic and ecological view it is very important that the environment is not contaminated by this way of processing.

According to a similar process invert sugar can be prepared directly from thin juice and for that reason the preparation and purification of invert sugar which afterwards should be dissolved again in water can be omitted. This can be achieved by subjecting the juice obtained after the extraction of reduced (grated) sugar beets (and/or mangels) with water to an ultrafiltration at a temperature of at least 10° C. followed by acidification by subjecting the permeate at a temperature of at least 10° C. to a treatment with a $H^+$-anion exchanger after which directly an almost pure syrup of invert sugar is obtained which can be crystallized in a way known per se.

Since both processes are carried out in almost the same way the essence of the present invention lies in the recovery of monosaccharides from poly-, oligo- and disaccharides containing tuberous plants by means of ultrafiltration which is characterized by reducing the roots of poly-, oligo- and/or disaccharides containing tuberous plants by grating, extracting the reduced material with unwarmed water then at first subjecting it to an ultrafiltration and further to a demineralization and hydrolyzing the saccharides present in the obtained solution by leading over a cation exchanger ($H^+$-form) or by acidification with an acid.

Preferably a mass reduced by grating is at first separated for the most part of the liquid present therein and then subjected to an extraction with water of at least 18° C.

The contact time at the extraction is for instance at most 1 hour.

It is preferred to carry out the extraction with water with a temperature of at most 10° C.

Further it is very important that the amount of water used for the extraction is such that the obtained solution contains 14–20 percent by weight of poly-, oligo- and disaccharides.

The sodium- and potassium salts which come into the extract will be removed therefrom by leading it over an ion exchanger.

The tuberous plants should be grated first to destroy the cells and to obtain the saccharides therefrom more easily.

After the grating the juice and the pulp are separated as completely as possible. Suitable separation methods are:

(a) use of a centrisieve with turning basket, in which the cell juice can be washed out;
(b) use of a vacuum band filter;
(c) use of a scroll containing solid-bowl decanter.

Preferably a press integrated with a band filter is used. The grated product can be pressed out quite easily, so that the losses of saccharides can be reduced strongly.

Besides the above tuberous plants other tuberous plants like Heliantus tuberosis, Topinambur and Jerusalem artichoke can be treated in an appropriate way according to the process of the invention.

EXAMPLE 100 kg of washed chicory roots were ground by means of a grater usually used in the potato starch industry. The so obtained grated product or mush was washed out with water of 18° C. in a continuous multistage- washing process according to the counter current principle and then the pulp and liquid were separated. This operation was carried out with a scroll containing solid-bowl decanter. Three of such decanters were used in series. The desugarized centrifugated pulp came out of the last (3rd) decanter. This last decanter was fed with an already partly desugarized pulp from the second stage decanter which was mixed with pure water of 10° C. The amount of water was minimal because the counter current principle was applied.

110 kg cell juice containing 15.9 kg of carbohydrates mainly inulin, were subjected to ultrafiltration for removing the macromolecules (molecular weight $\geqq$20000 daltons) likes gums and proteins. For reducing the loss of carbohydrates 2.2 kg of water is used for the diafiltration. The retentate contains the undesired contaminations which affect the demineralization because they would form a precipitation on the cation exchanger.

The permeate contains 15.7 kg of carbohydrates of which a very small percentage consists of monosaccharides. The permeate stream is led over a cation exchange resin (IR-210) in the $H^+$-form. Metal ions in the juice are exchanged for $H^+$-ions of the resin so that the acidity decreases strongly.

The pH varies then between 2.1 and 1.95.

After the hydrolyzation the temperature is 70° C.

After a residence time of 30 minutes at this temperature and acidity the hydrolysis is proceeded for 50%; after 90 minutes for more than 95%.

Then the hydrolysate is freed of anions by means of an anion exchange resin.

The totally demineralized juice is completely decolorized with calcium- free active carbon. The very pure juice is concentrated to a syrup containing 12.1 kg of fructose and 1.4 kg of glucose.

We claim:

1. A process for the recovery of monosaccharides from poly-, oligo-, and disaccharides containing tubers comprising the steps of:

(a) reducing said tubers to a mush by grating;
(b) subjecting the resulting mush to extraction with substantially pure water at a temperature of 18° C. or below to produce an extract;
(c) subjecting the said extract to ultrafiltration to form a filtrate;
(d) subjecting said filtrate to demineralization to form a demineralized filtrate; and
(e) subjecting said demineralized filtrate to hydrolization by passing said demineralized filtrate over a cation exchange (H+form) or by acidifying with a acid.

2. The process according to claim 1, characterized in that the extraction is carried out for a period of at most 1 hour.

3. The process according to claim 1, characterized in selecting the amount of water used for the extraction in such a way that the obtained solution contains 14–20 percent by weight of poly-, oligo- and/or disaccharides.

4. The process according to claim 1, characterized, in hydrolyzing the ultrafiltrated extract of chicory roots by passing it for at most 2 minutes at 60°–130° C. over a cation exchanger.

* * * * *

UNITED STATES PATENT AND TRADEMARK OFFICE

CERTIFICATE OF CORRECTION

PATENT NO. : 4,702,839

DATED : October 27, 1987

INVENTOR(S) : KEES KOERTS, THEODOOR R. HANSSENS

It is certified that error appears in the above-identified patent and that said Letters Patent is hereby corrected as shown below:

Column 1, line 24, separate the words "calcium" and "oxide".

Column 4, line 29, change "exchange" to --exchanger--.

Signed and Sealed this

Fifth Day of April, 1988

*Attest:*

DONALD J. QUIGG

*Attesting Officer*

*Commissioner of Patents and Trademarks*